US006829345B2

United States Patent
Savoor et al.

(12) United States Patent
(10) Patent No.: US 6,829,345 B2
(45) Date of Patent: Dec. 7, 2004

(54) TRUNK DESIGN OPTIMIZATION FOR PUBLIC SWITCHED TELEPHONE NETWORK

(75) Inventors: Raghvendra G. Savoor, Walnut Creek, CA (US); Andre Fuetsch, Houston, TX (US); Frederick Michael Armanino, San Antonio, TX (US); Baofeng Jiang, Pleasanton, CA (US); Peter Wong, Newark, CA (US); Mengfeng Tsai, Freemont, CA (US); David Lewis Kimble, Danville, CA (US)

(73) Assignee: SBC Services, Inc., San Antonio, TX (US)

( * ) Notice: Subject to any disclaimer, the term of this patent is extended or adjusted under 35 U.S.C. 154(b) by 0 days.

(21) Appl. No.: 10/023,864

(22) Filed: Dec. 21, 2001

(65) Prior Publication Data

US 2003/0118169 A1 Jun. 26, 2003

(51) Int. Cl.[7] .................................................. H04M 7/00
(52) U.S. Cl. ............. 379/219; 379/221.01; 379/221.02; 379/221.03; 379/221.14
(58) Field of Search ........................ 379/221.01, 221.02, 379/221.03, 221.14

(56) References Cited

U.S. PATENT DOCUMENTS

| | | | | |
|---|---|---|---|---|
| 4,284,852 A | * | 8/1981 | Szybicki et al. ....... | 379/221.01 |
| 4,748,658 A | * | 5/1988 | Gopal et al. ........... | 379/221.01 |
| 5,295,183 A | * | 3/1994 | Langlois et al. ....... | 379/112.04 |
| 5,329,526 A | | 7/1994 | Murata et al. | |
| 5,844,886 A | | 12/1998 | Szentesi | |
| 5,844,981 A | * | 12/1998 | Pitchford et al. ...... | 379/221.01 |
| 5,862,203 A | | 1/1999 | Wulkan et al. | |
| 5,878,127 A | | 3/1999 | Fleischer, III | |
| 5,974,132 A | | 10/1999 | Ricciardi et al. | |
| 5,974,133 A | | 10/1999 | Fleischer, III | |
| 5,995,618 A | | 11/1999 | Bradley et al. | |
| 6,141,410 A | | 10/2000 | Ginzboorg | |
| 6,222,822 B1 | | 4/2001 | Gerardin et al. | |
| 6,226,365 B1 | | 5/2001 | Mashinsky | |
| 6,252,950 B1 | | 6/2001 | Duty et al. | |
| 6,259,776 B1 | | 7/2001 | Hunt | |
| 6,282,267 B1 | * | 8/2001 | Nolting .................... | 379/32.03 |
| 6,298,123 B1 | | 10/2001 | Nolting et al. | |
| 6,304,635 B1 | | 10/2001 | Iwami et al. | |

* cited by examiner

Primary Examiner—William J. Deane, Jr.
Assistant Examiner—Marie C. Ubiles
(74) Attorney, Agent, or Firm—Greenblum & Bernstein, P.L.C.

(57) ABSTRACT

A method and system enable optimization of trunk group design in a public switched telephone network (PSTN). A community of interest, including two end offices connected by a direct trunk and at least one tandem switch, is identified using out-of band signaling data collected from the PSTN. An application server interfaced to the PSTN determines whether traffic in the community of interest passes through the tandem switch during a predetermined time period. When traffic passes through the tandem switch, the application server further determines whether the direct trunk between the end offices experienced an overflow condition during the same predetermined time period. When the direct trunk did not experience an overflow condition, an exchange code associated with the traffic passing through the tandem switch is designated as a misrouted code. The misrouted code is flagged so that associated traffic is redirected through the direct trunk.

22 Claims, 6 Drawing Sheets

TRUNK DESIGN OPTIMIZATION FOR PUBLIC SWITCHED TELEPHONE NETWORK

BACKGROUND OF THE INVENTION

1. Field of the Invention

The present invention relates to the field of telecommunications. More particularly, the present invention relates to optimizing the design of trunk routing among switches in a telecommunications network.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, the acronyms are defined as follows:

Answer Complete Message (ACM)
Answer Message (ANM)
Call Detail Record (CDR)
Centum-Call Seconds (CCS)
Central Exchange Service (Centrex)
Carrier Identification Code (CIC)
Competitive Local Exchange Carrier (CLEC)
Data Collection Operations System (DCOS)
Electronic Key Telephone System (EKTS)
Generic Access Profile (GAP)
Grade of Service (GOS)
Graphical User Interface (GUI)
HyperText Mark-Up Language (HTML)
HyperText Transfer Language Protocol (HTTP)
Incumbent Local Exchange Carrier (ILEC)
Initial Address Message (IAM)
Interexchange Carrier (IXC)
Internet Service Provider (ISP)
Local Exchange (NXX)
Local Routing Number (LRN)
Numbering Plan Area (NPA)
Plain Old Telephone Service (POTS)
Private Branch Exchange (PBX)
Public Switched Telephone Network (PSTN)
Release (REL)
Release Complete (RLC)
Secure Sockets Layer (SSL)
Service Control Point (SCP)
Service Switching Point (SSP)
Signaling System 7 (SS7)
Signaling Transfer Point (STP)
Transaction Capabilities Application Part (TCAP)
Transmission Control Protocol/Internet Protocol (TCP/IP)
Trunk Circuit Identification Code (TCIC)
Trunk Integrated Records Keeping System (TIRKS)
Total Network Data System (TNDS)

3. Background Information

The public switched telephone network (PSTN) consists generally of a series of switches capable of logically routing calls through the telecommunications network based, in part, on call origin and destination. Commonly, the PSTN includes two types of switches: class five switches, also known as an end office or a service switching point (SSP), and class four switches, also known as a tandem switch. The switches are controlled by associated signaling transfer points (STPs) and service control points (SCPs), which provide instruction on call routing, as well as a variety of network implemented call services.

The end offices connect the PSTN to the network users' telephone systems, including business related Centrex and private branch exchange (PBX) systems, as well as the plain old telephone service (POTS) systems, relied on by most residential customers. Other users involve entire networks, such as Internet service providers (ISP) and the like. The tandem switches are intermediate switches, incorporated in routing between the originating end office and the terminating end office. The various switches in the PSTN are connected by communication lines called trunks. A group of similar trunks that connect the same geographic locations are referred to as trunk groups. Depending on the volume of traffic, several trunk groups may simultaneously service two particular points in the PSTN.

The trunk groups interconnecting the switches are designed and implemented based on analysis of telecommunications traffic, which has consistently and dramatically increased over the past several years. Trunk planners and network design engineers attempt to identify communications paths among switches that carry an especially high amount of traffic or load from point to point. Switches carrying especially high loads are connected with direct trunk groups to accommodate the traffic, preferably without wasting resources. As PSTN traffic increases, along with the number of interconnecting carriers, such as competitive local exchange carriers (CLECs), wireless carriers, interexchange carriers (IXCs) and independent carriers, the new and shifting traffic depend largely on tandem switches as primary hubs. The increased traffic loads and carriers have exhausted the tandem switches driving increased capital investment in the PSTN (e.g., additional tandem switches and associated trunk groups). Often, though, tandem switches and trunk groups are added to relieve overburdened resources, while other existing tandem switches and trunk groups are not being used to their fullest capacity. This misuse of resources is due to the limited ability to accurately quantify and analyze the actual traffic loads at each tandem switch.

The dynamic nature of network traffic enables continual production of new and different "communities of interest" between end offices, which create opportunities to off-load traffic from the exhausted tandem switches. There are various types of communities of interest, the respective identities of which depend on purpose and location. For example, ISP traffic is a community of interest based on a centralized ISP location, which ordinarily exists outside a major metropolitan area. In contrast, a business related community of interest, involving a Centrex system, for example, would likely be centered in a metropolitan area, requiring an entirely different routing scheme.

Under the existing methodology, however, opportunities to off-load traffic are difficult, if not impossible, to identify. For example, in the past, network designers have analyzed traffic loads on a switch by switch basis, looking at the inbound and the outbound loads at an end office, only, and primarily relying on manual quantification of the required trunk groups between any two end points. The quantification data was largely anecdotal (e.g., statistical and empirical sampling), as opposed to empirically comprehensive. The designers were not able to precisely correlate a set of intervening tandem switches that enabled the line of communication for two end points (e.g., a point to point community of interest). Also, the designers were not able to effectively implement information that was potentially available to them. Therefore, it was difficult to identify and size new high usage groups within the PSTN, leaving the bulk of the communications traffic on the tandem switches.

The present invention overcomes the problems associated with the prior art, as described below.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF EMBODIMENTS

Figure 1:
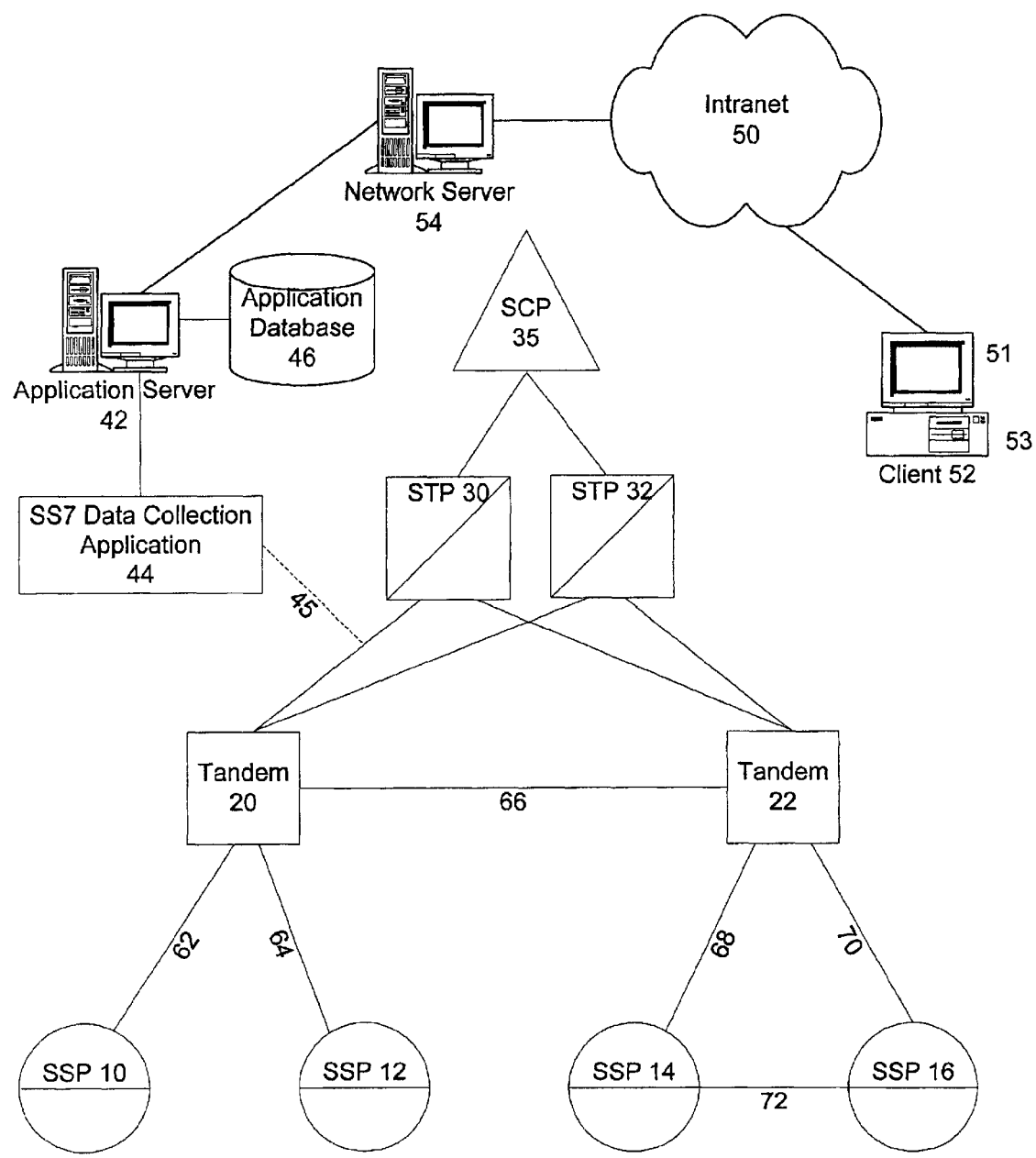
FIG. 1 is a block diagram showing an exemplary telecommunications network for trunk design optimization, according to an aspect of the present invention.

The present invention relates to trunk design optimization that is based on collection of empirical routing data collected using, for example, signaling system 7 (SS7) out-of-band signaling data. The existing telephone call routing is monitored among end office and tandem switches in the PSTN. The monitoring enables network designers to identify potential direct routing opportunities, which may be ultimately implemented depending on other design parameters. Also, the present invention enables accurate and timely identification of misrouted traffic, which may be redirected by design to further increase telephone traffic routing efficiency of the PSTN.

The monitoring specifically enables peak busy hour offered load to be determined between sets of switches, including two end offices, two tandem switches or an end office and a tandem switch, which are referred to as point-to-point communities of interest. The peak busy hour offered load includes the minutes of use generated as a result of calls originating on either end of a trunk. Offered load differs from carried load, for example, in that carried load represents the traffic actually carried over a particular trunk, while offered load includes traffic offered to the trunk, but ultimately routed elsewhere or otherwise blocked. The aggregate peak busy hour offered load represents the maximum minutes of use offered to the network.

The primary objective is to optimally design the PSTN trunk network by routing traffic more efficiently over the existing trunk and switching infrastructure, including relieving loads on over-burdened tandem switches, as well as identifying and addressing overflow conditions and traffic misroutes. The most cost effective routes are determined based on continually revised data collected from within the PSTN, while maintaining the objective grade of service for the customers. Significant cost savings are realized by relieving congested tandem switches and increasing the loading on under-utilized tandem switches. Also, capital investment in the PSTN is reduced by minimizing the need for additional physical equipment (i.e., new tandem switches).

In view of the above, the present invention through one or more of its various aspects and/or embodiments is presented to accomplish one or more objectives and advantages, such as those noted below.

An aspect of the present invention provides a method for identifying misrouting of traffic in a telecommunications network. The method includes identifying a community of interest based on call signaling data, the community of interest including at least one intermediate switching location connected to a first terminal switching location connected by a direct trunk to a second terminal switching location. The call signaling data may include out-of-band signaling data, such as SS7 messages, collected from the intermediate switching location. The intermediate and terminal switching locations may be class four and class five switches, respectively.

It is determined whether traffic in the community of interest passes through the intermediate switching location during a predetermined time period and whether the direct trunk experienced an overflow condition during the same predetermined time period. When traffic in the community of interest is determined to have passed through the intermediate switching location during the predetermined time period, and the direct trunk is determined not to have experienced an overflow condition during the predetermined time period, an identifier associated with the traffic that passed through the intermediate switching location is designated as misrouted traffic. The identifier may be an exchange code, such as a numbering plan area (NPA)/local exchange (NXX) code.

The method may further include flagging the identifier associated with the misrouted traffic to redirect the misrouted traffic through the direct trunk. Also, a volume of the misrouted traffic may be identified and a load on the intermediate switch attributed to the misrouted traffic based on the volume may be quantified.

Another aspect of the present invention provides a method for identifying misrouting of traffic in a community of interest of a telecommunications network, the community of interest including at least a tandem switch connected to a first end office switch connected by a direct trunk to a second end office switch. The method includes generating a base component relating to the community of interest based on out-of-band signaling data, which may include SS7 messages. The base component includes predetermined time periods and a volume of traffic passing through the tandem switch during each of the predetermined time periods.

The method determines whether the base component indicates traffic through the tandem switch in the community of interest during at least one of the predetermined time periods. When the tandem switch shows traffic, the method determines whether the direct trunk experienced an overflow condition during the corresponding predetermined time period. When the direct trunk did not experience an overflow condition, at least one unique code associated with the community of interest is identified as a misrouted code. The unique code may include an NPA/NXX code. The method may further include identifying a volume of the traffic associated with the misrouted code and quantifying a load on the tandem switch attributed to the misrouted traffic.

Another aspect of the present invention provides a system for identifying misrouting of traffic in a telecommunications network, the system including a data collection application device, configured to receive out-of-band signaling data from the PSTN, and an application server connected to the data collection application device. The out-of-band signaling data may include SS7 messages, for example. The application server identifies a community of interest in the PSTN based on the out-of-band signaling data received by the data collection application device. The community of interest includes at least one intermediate switching location connected to a first terminal switching location and a second terminal switching location, where the first terminal switching location is connected by a direct trunk to the second terminal switching location.

The application server determines whether traffic in the community of interest passes through the intermediate switching location during a predetermined time period and whether the direct trunk experienced an overflow condition during the predetermined time period. When traffic in the community of interest is determined to have passed through the intermediate switching location and the direct trunk is determined not to have experienced an overflow condition during the predetermined time period, the application server designates an identifier associated with the traffic as misrouted traffic. The identifier may include an NPA/NXX code.

The system may further include an application database, connected to the application server. The application database stores information relating to at least the community of interest, the determination of whether the traffic passed through the intermediate switching location during the predetermined time period, the determination of whether the direct trunk group experienced an overflow condition during the predetermined time period, and the identifier. Also, the system may include a data network connecting the application server and the application database to at least one graphical user interface and enabling analysis of the stored information.

Another aspect of the present invention provides a system for identifying misrouting of traffic in a community of interest of a PSTN, the community of interest including at least one tandem switch connected to a first end office switch connected by a direct trunk to a second end office switch. The system includes an SS7 data collection device, configured to receive out-of-band signaling data from the PSTN, and an application server connected to the data collection device.

The application server identifies the community of interest and determines whether traffic in the community of interest passes through the tandem switch during a predetermined time period, based on the out-of-band signaling data provided by the data collection device. When traffic is determined to have passed through the tandem switch, the application server further determines whether the direct trunk experienced an overflow condition during the predetermined time period. When the direct trunk did not experience an overflow condition, the application server designates at least one exchange code associated with the traffic that passed through the tandem switch as a misrouted code. The application server, together with an associated database, is configured to provide information relating to at least the community of interest, the tandem switch and the misrouted code to at least one graphical user interface. The application server may further identify a volume of the traffic having the misrouted code and quantify a load on the tandem switch attributed to the misrouted traffic based on the volume.

Yet another aspect of the present invention provides a computer readable medium for storing a computer program that identifies misrouting of traffic in a community of interest of a telecommunications network, where the community of interest includes at least a tandem switch connected to a first end office switch and a second end office switch. The computer readable medium includes a generating source code segment that generates a base component relating to the community of interest based on out-of-band signaling data, the base component including multiple predetermined time periods and a volume of traffic passing through the tandem switch in the community of interest during each of the plurality of predetermined time periods. The out-of-band signaling data may include SS7 messages. The computer readable medium further includes a determining source code segment that determines whether the base component indicates traffic through the tandem switch during at least one of the predetermined time periods and, when the tandem switch shows traffic, determines whether the direct trunk experienced an overflow condition during the corresponding predetermined time periods. The computer readable medium also includes an identifying source code segment that identifies at least one unique code associated with the community of interest as a misrouted code when the direct trunk did not experience an overflow condition during the corresponding predetermined time period. The computer readable medium may further include a quantifying source code segment that identifies a volume of the traffic associated with the misrouted code and quantifies a load on the tandem switch attributed to the misrouted traffic.

Another aspect of the present invention provides a method for designing a telecommunications network to improve call traffic routing efficiency with respect to at least one community of interest in the telecommunications network, the community of interest including at least a first end office switch and a second end office switch. The method includes collecting out-of-band signaling data from the telecommunications network, quantifying a peak busy hour offered load for the community of interest based on the out-of-band signaling data, and determining whether the peak busy hour offered load for the community of interest exceeds a predetermined threshold. When the peak busy hour offered load exceeds the predetermined threshold, it is determined whether the first end office switch and second end office switch are connected by a direct trunk. When the first and second end office switches are not connected by a direct trunk, the community of interest is identified as a primary high usage direct trunk opportunity and data relating to the identified direct trunk opportunity is stored in an application database. The stored data includes at least an identification of the first and second end office switches and sizing information relating to the direct trunk opportunity. When the first and second end office switches are connected by a direct trunk, the direct trunk may be identified as an augment opportunity for at least one other direct trunk existing in the telecommunications network. The augment opportunity data is then stored, including at least an identification of the first and second end office switches.

Another aspect of the present invention provides a method for designing a telecommunications network to improve call traffic routing efficiency with respect to at least one community of interest in the telecommunications network, the community of interest including at least an end office switch and a tandem switch. The method includes collecting out-of-band signaling data from the telecommunications network, quantifying a peak busy hour offered load for the community of interest based on the out-of-band signaling data, and determining whether the peak busy hour offered load for the community of interest exceeds a predetermined threshold. When the peak busy hour offered load exceeds the predetermined threshold, it is determined whether the end office switch and tandem switch are connected by a direct trunk. When the switches are not connected by a direct trunk, the community of interest is identified as an intermediate high usage direct trunk opportunity and data relating to the identified direct trunk opportunity is stored in an application database. The stored data includes at least an identification of the end office switch and the tandem switch, and sizing information relating to the direct trunk opportunity. When the switches are connected by a direct trunk, the direct trunk may be identified as an augment opportunity for at least one other direct trunk existing in the telecommunications network. The augment opportunity data is then stored, including at least an identification of the end office switch and the tandem switch.

Another aspect of the present invention provides a method for designing a telecommunications network to improve call traffic routing efficiency with respect to at least one community of interest in the telecommunications network, the community of interest including at least two switches, corresponding to endpoints of the community of interest. The method includes collecting signaling data from the telecommunications network, quantifying a peak busy hour offered load for the community of interest based on the signaling data, and determining whether the peak busy hour offered load for the community of interest exceeds a predetermined threshold. When the peak busy hour offered load exceeds the predetermined threshold, it is determined whether the two switches are connected by a direct trunk. When two switches are not connected by a direct trunk, the community of interest is identified as a direct trunk opportunity and the direct trunk opportunity is sized based on the peak busy hour offered load for the community of interest. Data relating to the identified direct trunk opportunity is stored in an application database, the data including at least an identification of the two switches and the sizing information. When the two switches are determined to be connected by a direct trunk, the direct trunk is identified as an augment opportunity for at least one other community of interest in the telecommunications network and augment opportunity data relating to the augment opportunity is stored in the application database, the augment opportunity data including at least an identification of the two switches.

The methods for designing a telecommunications network to improve call traffic routing efficiency, described above, may further include accessing the application database from a graphical user interface. The stored data is retrieved from the application database and displayed at the graphical user interface. An improvement is then designed to the call traffic routing efficiency in the telecommunications network based at least the displayed stored data. The application database may be accessed by connecting to an application server through a packet switched data network from the graphical user interface, the application server being in communication with the application database.

Another aspect of the present invention provides a system for designing a telecommunications network to improve call traffic routing efficiency with respect to at least one community of interest in the PSTN, the community of interest including at least a first end office switch and a second end office switch. The system includes a signaling data collection device, configured to receive signaling data from the PSTN, an application server connected to the data collection device, and an application database, connected to the application server. The application server identifies the community of interest, quantifies a peak busy hour offered load corresponding to the community of interest based on the signaling data, and determines whether the peak busy hour offered load exceeds a predetermined threshold.

When the peak busy hour offered load exceeds the predetermined threshold, the application server further determines whether a direct trunk connects the first and second end office switches in the community of interest. When the first and second end offices are not connected by a direct trunk, the application server identifies a primary high usage direct trunk opportunity between the first and second end office switches and the application database stores information related to the high usage direct trunk opportunity, including identification of the first and second end office switches and sizing information related to the primary high usage direct trunk group opportunity. When the first and second end offices are connected by a direct trunk, the application server identifies the direct trunk as an augment opportunity for at least one other community of interest in the PSTN, and the application database stores information related to the augment opportunity. The information includes identification of the first and second end office switches and the direct trunk.

Another aspect of the present invention provides a system for designing a telecommunications network to improve call traffic routing efficiency with respect to at least one community of interest in the PSTN, the community of interest including at least an end office switch and a tandem switch. The system includes a signaling data collection device, configured to receive signaling data from the PSTN, an application server connected to the data collection device, and an application database, connected to the application server. The application server identifies the community of interest, quantifies a peak busy hour offered load corresponding to the community of interest based on the signaling data, and determines whether the peak busy hour offered load exceeds a predetermined threshold.

When the peak busy hour offered load exceeds the predetermined threshold, the application server further determines whether a direct trunk connects the end office switch and the tandem switch. When the switches are not connected by a direct trunk, the application server identifies an intermediate high usage direct trunk opportunity between the switches and the application database stores information related to the intermediate high usage direct trunk opportunity, including identification of the end office switch and the tandem switch, and sizing information related to the intermediate high usage direct trunk group opportunity. When the switches are connected by a direct trunk, the application server identifies the direct trunk as an intermediate augment opportunity for at least one other community of interest in the PSTN, and the application database stores information related to the intermediate augment opportunity. The information includes identification of the end office switch, the tandem switch and the direct trunk.

The systems for designing a telecommunications network to improve call traffic routing efficiency, described above, may further include a packet switched data network connecting the application server to at least one graphical user interface. The application server may then retrieve the stored information from the application database and display the stored information at the graphical user interface, enabling design of improved call traffic routing efficiency.

Yet another aspect of the present invention provides a computer readable medium storing a computer program that enhances designing of a telecommunications network to improve call traffic routing efficiency with respect to at least one community of interest in the telecommunications network. The community of interest includes at least two switches corresponding to endpoints of the community of interest. The computer readable medium includes a data collection source code segment that collects out-of-band signaling data from the telecommunications network; a quantifying source code segment that quantifies a peak busy hour offered load for the community of interest based on the out-of-band signaling data; and a determining source code segment that determines whether the peak busy hour offered load for the community of interest exceeds a predetermined threshold and, for each peak busy hour offered load exceeding the predetermined threshold, that determines whether the two switches of the community of interest are connected by a direct trunk. The computer readable medium further includes an identifying source code segment that identifies a direct trunk opportunity for when the two endpoint switches are determined not to be connected by a direct trunk and a sizing source code segment that estimates a size of the direct trunk opportunity based on the peak busy hour offered load. There is also a storing source code segment that stores data relating to the direct trunk opportunity in an application database, the data comprising at least an identification of the two endpoint switches and the sizing information.

In addition, the computer readable medium may include an augmentation source code segment that identifies the direct trunk as an augment opportunity for at least one other community of interest in the telecommunications network when the two switches are determined to be connected by the direct trunk. The storing source code segment may then store data relating to the augment opportunity in the application database. The augment data includes at least an identification of the two endpoint switches and the direct trunk.

Another aspect of the present invention provides a method for increasing call traffic routing efficiency in a telecommunications network to improve call traffic routing efficiency with respect to intermediate high usage direct trunk opportunities in a telecommunications network. The method includes identifying at least a first terminal switching location in the telecommunications network that has been rehomed to a first intermediate switching location and at least a second terminal switching location in the telecommunications network that is homed to an intermediate switching location other than the first intermediate switching location. A first peak load is quantified, based on signaling data collected from the telecommunications network, between the first terminal switching location and the second terminal switching location. It is determined whether the first peak load exceeds a predetermined amount.

When the first peak load exceeds the predetermined amount, a route between the second terminal switching location and the first intermediate switching location is identified as a new intermediate high usage direct trunk opportunity. The new intermediate high usage direct trunk opportunity is sized based on the signaling data and data relating to the new intermediate high usage direct trunk opportunity is stored in an application database. The data includes at least identification of the first and second terminal switching locations, the first intermediate switching location and the sizing information.

The method may further include identifying at least a third terminal switching location in the telecommunications network that is originally homed to the first intermediate switching location. A second peak load is then quantified based on the signaling data collected from the telecommunications network between the third terminal switching location and the second terminal switching location. It is determined whether the second peak load exceeds the predetermined amount. When the second peak load exceeds the predetermined amount, a route between the second terminal switching location and the third terminal switching location is identified as a second new intermediate high usage direct trunk opportunity and the second new intermediate high usage direct trunk opportunity is sized based on the signaling data. The data relating to the second new intermediate high usage direct trunk opportunity is stored in the application database. The data includes at least identification of the second and third terminal switching locations, the first intermediate switching location and the sizing information related to the second new intermediate high usage direct trunk opportunity.

Another aspect of the present invention provides a method for designing a telecommunications network to improve call traffic routing efficiency, the telecommunications network including multiple end office switches and tandem switches, where at least a first end office switch of the multiple end office switches is rehomed to a new tandem switch of the multiple tandem switches. The method includes collecting out-of-band signaling data from the telecommunications network and identifying at least one homed end office switch of the multiple end office switches, including the first end office switch, that is homed to the new tandem switch. At least one far end office switch of the multiple end office switches is identified, where the far end office switch is homed to a tandem switch other than the new tandem switch.

A peak busy hour offered load is quantified between each homed end office switch and each far end office switch, based on the out-of-band signaling data. It is determined whether each peak busy hour offered load exceeds a predetermined amount. For each peak busy hour offered load that exceeds the predetermined amount, a route is identified between the corresponding far end office switch and the new tandem switch as a new intermediate high usage direct trunk opportunity. Each new intermediate high usage direct trunk opportunity is sized based on the out-of-band signaling data. Data relating to each identified new intermediate high usage direct trunk opportunity is stored in an application database, the data including at least information relating to the corresponding far end office switch, the new tandem switch and the sizing.

The methods for increasing call traffic routing efficiency in a telecommunications network to improve call traffic routing efficiency with respect to intermediate high usage direct trunk opportunities, described above, may further include accessing the application database to retrieve the stored data and designing an improvement to the telecommunications network to increase call traffic routing efficiency based on at least the stored data. Accessing the application database includes connecting to an application server through a packet switched data network from a graphical user interface, the application server being in communication with the application database. The stored data is retrieved from the application database and displayed the stored data at the graphical user interface.

Another aspect of the present invention provides a system for increasing call traffic routing efficiency in a telecommunications network, including a data collection application device, configured to receive signaling data from the PSTN, and an application server connected to the data collection application device. The application server identifies at least a first terminal switching location in the telecommunications network that has been rehomed to a first intermediate switching location in the telecommunications network; identifies at least a second terminal switching location that is homed to an intermediate switching location other than the first intermediate switching location; quantifies a first peak load between the second terminal switching location and the first intermediate switching location based on the signaling data; and determines whether the first peak load exceeds a predetermined amount. When the first peak load exceeds the predetermined amount, the application server identifies a route between the second terminal switching location and the first intermediate switching location as a new intermediate high usage direct trunk opportunity and estimates a size of new intermediate high usage direct trunk opportunity based on the signaling data.

The system for increasing call traffic routing efficiency in a telecommunications network may further include an application database, connected to the application server. The application database stores information relating to the new intermediate high usage direct trunk opportunity, the data including at least identification of the first and second terminal switching locations, the first intermediate switching location and the sizing information related to the new intermediate high usage direct trunk opportunity. The application server may also be connected to at least one graphical user interface, enabling analysis of the stored information.

Another aspect of the present invention provides a system for designing a telecommunications network to improve call traffic routing efficiency with respect to a multiple end office switches and tandem switches in the PSTN, where at least one of the end office switches is rehomed to a new tandem switch. The system includes an out-of-band signaling data collection device, configured to receive signaling data from the tandem switches in the PSTN, an application server connected to the data collection device, and an application database, connected to the application server. The application server identifies at least one homed end office switch of the multiple end office switches that is homed to the new tandem switch, including the at least one end office switch, and identifies at least one far end office switch of the multiple end office switches that is homed to a tandem switch other than the new tandem switch. The application server also quantifies a peak busy hour offered load between each homed end office switch and each far end office switch, based on at least the signaling data, and determines whether each peak busy hour offered load exceeds a predetermined amount.

For each peak busy hour offered load that exceeds the predetermined amount, the application server identifies a route from the corresponding far end office switch and the new tandem switch as a new intermediate high usage direct trunk opportunity and sizes the new intermediate high usage direct trunk opportunity. Also, the application database stores data relating to each identified new intermediate high usage direct trunk opportunity. The data includes at least information relating to the corresponding far end office switch, the new tandem switch and the sizing information related to the new intermediate high usage direct trunk opportunity.

Yet another aspect of the present invention provides a computer readable medium storing a computer program that enhances designing of a telecommunications network to improve call traffic routing efficiency, the telecommunications network including multiple end office switches and tandem switches, such that at least a first end office switch of the multiple end office switches is rehomed to a new tandem switch of the multiple tandem switches. The computer readable medium includes a data collecting source code segment, an identifying source code segment, a quantifying source code segment, a determining source code segment, a sizing source code segment and a storing source code segment. The data collecting source code segment collects out-of-band signaling data from the telecommunications network. The identifying source code segment identifies at least one homed end office switch of the multiple end office switches that is homed to the new tandem switch, including the first end office switch, and identifies at least one far end office switch of the multiple end office switches that is homed to a tandem switch other than the new tandem switch. The quantifying source code segment quantifies a peak busy hour offered load between each homed end office switch and each far end office switch, based on the out-of-band signaling data. The determining source code segment determines whether each peak busy hour offered load exceeds a predetermined amount and, for each peak busy hour offered load that exceeds the predetermined amount, identifies a route between the corresponding far end office switch and the new tandem switch as a new intermediate high usage direct trunk opportunity. The sizing source code segment then calculates an estimated size of the new intermediate high usage direct trunk opportunity based on the out-of-band signaling data and the storing source code segment stores data relating to each identified new intermediate high usage direct trunk opportunity in an application database. The stored data includes at least information relating to the corresponding far end office switch, the new tandem switch and the new intermediate high usage direct trunk opportunity sizing.

The various aspects and embodiments of the present invention are described in detail below.

The present invention enables analysis of call traffic within point-to-point communities of interest based on empirical data collected from the PSTN and based on actual out-of-band signaling data. Because the data collection and analysis process is ongoing, the PSTN routing may be continually monitored and redesigned to meet constantly evolving network conditions. The constantly evolving network conditions include traffic trends and interconnection dynamics that accommodate the large and ever increasing variety of telecommunications providers, such as CLECs, IXCs, ILECs and wireless providers. Also, actual PSTN usage changes based on the time of day, as well as the season of the year. Other exemplary design considerations include transit traffic, Internet dial-up traffic hold times, ISP migrations and regulatory mandates (e.g., local number portability, number pooling, etc.).

Because of the variety of the considerations affecting PSTN routing, the present invention focuses on the peak busy hour offered load for each tandem switch, servicing multiple end offices. In an embodiment, the peak busy hour offered load for individual end offices may also be considered. The base component for analysis is a point to point community of interest based on empirical network usage at a granular level reflecting every traffic type and routing condition.

FIG. 1 illustrates an exemplary telecommunications network, in association with the present invention, for implementing the call monitoring service. The telecommunications network includes four end offices, service switching point (SSP) 10, SSP 12, SSP 14 and SSP 16, which are class five switches in an embodiment of the invention. The end offices may service any type of telephone system or network, including a Centrex system, a PBX system, an electronic key telephone system (EKTS) or a POTS system. In addition to the end offices, FIG. 1 depicts two intermediate routing switches, tandem switch 20 and tandem switch 22, which are class four switches in an embodiment of the invention. The tandem switches 20 and 22 service the end offices, SSP 10, SSP 12 SSP 14 and SSP 16. The exemplary network also includes a pair of signaling transfer points (STPs), STP 30 and STP 32, and a service control point (SCP) 35.

Depending on the call origination, any of the end offices may be either an originating or a terminating end office. For example, if a call is placed from a telephone serviced by the SSP 10 to a telephone serviced by the SSP 14, the SSP 10 is the originating end office and the SSP 14 is the terminating end office. The SSPs 10, 12, 14 and 16 include, for example, 1AESS or 5ESS switches manufactured by Lucent Technologies, Inc. (Lucent); DMS-100 and DMS-10 switches manufactured by Nortel Networks Corporation (Nortel); AXE-10 switches manufactured by Telefonak-Tiebolaget LM Ericsson, or EWSD switches available from Siemens Information and Communication Networks, Inc. The switches may utilize an AIN Release 0.1 protocol. However, embodiments of the present invention may incorporate switches, such as ATM switches, that are incorporated into any alternative telecommunications technology. The tandem switches 20 and 22 include, for example, the APX 800 Multiservice Access Switch manufactured by Lucent and the DMS-250 and the CVX 1800 switches manufactured by Nortel.

By way of example, the SCP 35 is implemented with the Bellcore Integrated Service Control Point, loaded with ISCP software Version 4.4 (or higher), available from Telecordia, Murray Hill, N.J. In an alternative embodiment of the invention, the SCP 35 may be a Lucent Advantage SCP, with software release 94, available from Lucent Technologies, Inc.

Implementation of the present invention may be upgraded to accommodate future AIN releases and protocols and future trigger types. Specifications of AIN Release 0.1 SSPs may be found in Bellcore TR-NWT-001299, Switch-Service Control Point Application Protocol Interface Generic Requirements, and Telecordia Technical Reference TR-NWT-001298, AIN Switching Systems Generic Requirements, the disclosures of which are expressly incorporated by reference herein in their entireties.

The solid lines among the end offices and the tandem switches in FIG. 1 are the existing trunks (or trunk groups) 62, 64, 66, 68, 70 and 72, which indicate the existing routing design through the PSTN. The trunk group 72 is a direct trunk group between the SSP 14 and the SSP 16, which represents a point-to-point community of interest. Therefore, a call originating from a telephone serviced by the SSP 14 to a telephone serviced by the SSP 16 is ideally routed directly from the originating end office, SSP 14, to the terminating end office, SSP 16, with no routing through intervening tandem switches. In other words, the call involves a single or direct "hop" from the originating end office to the terminating end office. The decision to implement a direct trunk group is based on engineering considerations, indicating a sufficient flow of traffic between the SSP 14 and the SSP 16 to warrant the dedicated trunk group 72. As stated above, conventional engineering considerations are based on sampled data from a single network element and often fail to represent the true offered load, especially during peak activity.

The trunk groups within other point-to-point communities of interest are likewise the result of engineering design considerations. For example, telephone calls originating at the SSP 10 and terminating at the SSP 16 follow the trunk group 62 to the tandem switch 20, the trunk group 66 to the tandem switch 22 and the trunk group 70 to SSP 16. In other words, the call involves three "hops" to reach the terminating end office. The routing is a result of design criteria indicating that connection requests between the SSP 10 and the SSP 16 were relatively infrequent, and therefore did not warrant a direct trunk connection between the two, or even routing through a single, intervening tandem switch.

FIG. 1 further depicts an exemplary data network of the invention, including a client 52, a network server 54 and an application server 42, connectable through a data network, such as an intranet 50, which is a packet switched data network. The client 52 includes a graphical user interface (GUI) 51, e.g., a personal computer (PC), operating client software 53. The client 52 and the client software 53 may be implemented with an IBM Pentium based PC, for example, using the Microsoft Windows 98 or Microsoft Windows NT operating system, available from Microsoft Corporation. The client software 53 further includes a web browser, such as Microsoft Internet Explorer or Netscape Navigator, available from Netscape Communications Corporation. In an embodiment of the invention, the client software 53 may further include any design software capable of processing the network data stored, for example, at the application database 46.

The application server 42 may be a UNIX server, for example, and is capable of receiving information from the PSTN via the signaling data collection application 44. The application server 42 is also connected to the application database 46, which is an historical database for storing design related data, such as PSTN network configurations, historical usage, offered load data, and the like. The application database 46 enables engineering analysis of the traffic and routing opportunities in the PSTN. The application server 42 may also maintain authentication data that limits access to at least the application database 46 in order to protect proprietary information of the network provider. The authentication data may include, for example, a user number and an associated password or other personal identification.

To enable design based on the data in the application database 46, the trunk planners and/or network design engineers access the system through the network server 54. For example, an engineer connects from the client 52 to the network server 54 through the intranet 50. The network server 54 then connects to application server 42. In an embodiment of the invention, the application server 42 may be accessed by the client 52 via secure connections through the Internet, using for example, secure sockets layer (SSL) protocol, developed by Netscape Communications. The network server 54 runs, for example, the Linux or Microsoft Windows operating system and the Apache web server software, available from the Apache Software Foundation, or the Jigsaw web server software, available from World Wide Web Consortium (W3C). The network server 54 receives, for example, HTTP messages from the client 52 and provides HTML web pages in response to the subscriber's input. When the application server 42 is also used for authentication, it receives authentication data from the client 52 via the network server 54 and verifies the authentication data before enabling access to the application database 46. Alternatively, the client 54 may connect to the application server 42 via the intranet 50 without passing through an additional network server.

The application server 42 retrieves network design data from the application database 46, including potential primary and intermediate high usage trunk groups, as well as traffic misroutes, discussed in detail below. The application server 42 may also retrieve previously stored network design information regarding the current setup of the telecommunications network, as well as traffic monitored at the end offices. In an embodiment of the invention, the application server 42 includes PSTN design application software that enables the network design and includes, for example, calculators running the predetermined traffic engineering algorithms and actionable database reports listing the identified primary and intermediate high usage direct trunk group opportunities and misrouted traffic data. An interactive connection is maintained among the application server 42, the application database 46, the network server 54 and the client 52, enabling the network design engineer to access, review and incorporate the trunk design data in the design process.

The signaling data collection application 44 shown in FIG. 1 may be an SS7 based application, such as Sentinel, available from Tekelec, Inc., LinkQuest II, available from Tekno Industries, Inc., AcceSS7, available from Agilent Technologies, or Mass Data Collection (MDC), available from Telecordia. The signaling data collection application 44 collects raw signaling data from the PSTN by monitoring the SS7 links (e.g., A-links, B-links and D-links) among the switches (e.g., the class four and class five switches) and the associated STP. Alternatively, the SS7 data may be monitored and collected from interconnecting STP pairs. FIG. 1 depicts the SS7 signaling data being collected from links between the tandem switches 20 and 22 and the associated pair of STPs 30 and 32, as indicated by the dashed line 45.

The individual SS7 messages that set up telephone calls through the PSTN are collected and correlated to produce a call detail record (CDR) related to each call. The SS7 messages include, for example, an initial address message (IAM) that indicates the time the call was placed, the calling party number, the called party number and the switch addresses. The SS7 messages also include answer data with respect to the called party, such as an answer complete message (ACM), which indicates that the call is received and the called party line is not busy, and an answer message (ANM), which indicates that the call has been answered and includes the time the called party goes off-hook in response to the call. The SS7 messages that indicate the termination of a call included, for example, a release (REL) message, which indicates when one of the parties goes back on hook, ending the call, and a release complete (RLC) message, which indicates that the called party line is no longer in use. A CDR corresponding to a call is then derived, in part, using the standard SS7 signaling messages. For example, the circuit duration may be determined by comparing the IAM and REL messages, while the conversation duration may be determined by comparing the ANM and the REL messages.

Referring to FIG. 1, the CDRs are sent from the SS7 data collection application 44 to the application server 42 for processing. In an embodiment of the invention, each CDR includes the following parameters: time and date of the call, circuit duration, conversation duration, release status, multi-hop counter, origination point code, destination point code, called number, calling number, charged number, redirect flag, local routing number (LRN), generic access profile (GAP) (for wireless calls), trunk circuit identification code (TCIC), carrier identification code (CIC), traffic type (e.g., voice, 64 kbps) and SS7/multifrequency interworking. Significantly, for purposes of the present invention, the multi-hop counter indicates the number of call legs used to complete the call, i.e., the number of switches to which the call is routed from the originating end office, including the terminating end office and the intervening tandem switches. For example, a call that proceeds from the originating end office directly to the terminating end office is a single hop call. Based on the CDRs received via the SS7 data collection application 44, the application server 42 identifies current routing from endpoint to endpoint, analyzes the extent of traffic handled by the switches based on the current routing, and identifies optional routing, if appropriate according to predetermined load parameters, discussed below.

Figure 2:
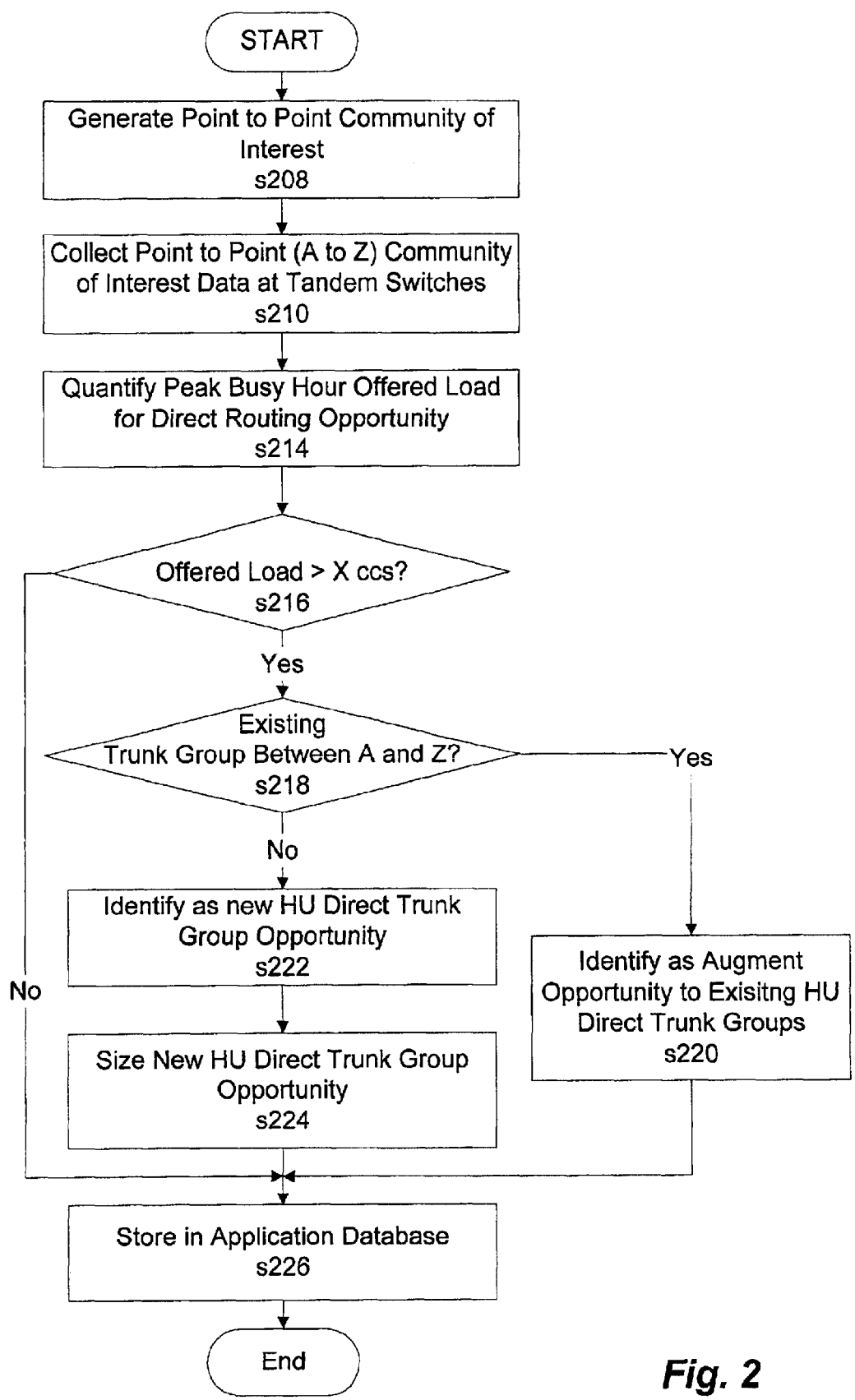
FIG. 2 is a flowchart of exemplary application logic for identifying new high usage direct trunk groups, according to an aspect of the present invention.

FIG. 2 is a flowchart depicting the application logic of a typical analysis performed by the application server 42 to identify opportunities for high usage direct trunk groups, according to an embodiment of the invention. In other words, the application server 42 determines whether the volume of traffic between two terminal locations (e.g., switches) warrants establishing a direct trunk group between the two locations. High usage opportunities between end offices (e.g., class five switches) are referred to as primary high usage direct trunk group opportunities. High usage opportunities between tandem switches (e.g., class four switches), or between tandem switches and end offices, are referred to as intermediate high usage direct trunk group opportunities. FIG. 2 is discussed in the context of identifying primary high usage direct trunk group opportunities, although the process is equally applicable to identifying the intermediate high usage direct trunk group opportunities.

At step s208, a point-to-point community of interest is generated based on an algorithm developed through network engineering. A point-to-point community of interest isolates the traffic between the two endpoints, i.e., the A and Z locations. In order to facilitate explanation, FIG. 2 illustrates generating (and processing) only one point-to-point community of interest. However, the invention encompasses performing the steps of FIG. 2 with respect to multiple communities of interest, and associated data, simultaneously or consecutively. Each point-to-point community of interest encompasses base components, defined by at least the following parameters resulting from the engineering algorithm: the identity of the A location, the identity of the Z location, the traffic type and pattern (e.g., one-way or two-way) between the two locations, an hour of the day, the minutes of use within the hour, the number of call attempts and completions, the average hold time during the hour, and the identity of the required trunk groups within the point-to-point community of interest based on the existing traffic engineering rules.

To identify primary high usage direct trunk group opportunities, the A and Z locations are the originating and terminating end offices. For example, FIG. 1 depicts six point-to-point communities of interest relevant to the primary high usage direct trunk group analysis: SSP10–SSP12, SSP 10–SSP 14, SSP 10–SSP 16, SSP 12–SSP 14, SSP 12–SSP 16 and SSP 14–SSP 16. However, the A and Z locations may include ISP serving numbers, remote switches serving designated codes, and the like. Depending on the scope of the engineering analysis, when identifying intermediate high usage direct trunk group opportunities, the A and Z locations also include intermediate switching points, such as tandem switches and other class four switches.

At step s210 of FIG. 2, data is collected corresponding to the point-to-point community of interest generated in at step s208 through the SS7 data collection application 44, as discussed above. In the embodiment of the invention shown in FIG. 2, the SS7 signaling data is collected only at the tandem switches 20 and 22. In other words, no SS7 signaling data is taken directly from the end offices, SSPs 10, 12, 14 or 16. By monitoring only the tandem switches, less data is collected and processed, thus increasing the efficiency of the design analysis. Furthermore, the tandem switches provide sufficient data to enable thorough design analysis because all of the traffic in the telecommunications network passes through the tandem switches, except for the traffic between end offices connected by direct trunk groups (e.g., direct trunk group 72 between the SSP 14 and the SSP 16). However, the direct trunk group traffic is not necessarily relevant to the design analysis, unless the direct trunk group traffic between end offices appears at a tandem switch, which would be apparent based on the SS7 signaling data taken from the tandem switch. For example, the appearance of the end office direct trunk group traffic at a tandem switch may indicate an overflow condition or misrouting of the direct trunk group traffic, as discussed below. In alternative embodiments of the invention, the SS7 signaling data may likewise be collected from the end offices.

The application server 42 quantifies the peak busy hour offered load for the point-to-point community of interest at step s214, based on the data received from the PSTN via the signaling data collection application 44. The peak busy hour offered load is measured based on the traffic between the two end locations in discrete hourly time periods. The busy hour offered load determination may be based on the hour involving the heaviest traffic over a 24 hour time period, or it may be based on data collected over several days and averaged. Designing to the highest traffic period assures that the resulting network is able to accommodate the call volume even when point-to-point communities of interests sharing network elements have simultaneous peak busy hours. The peak busy hour offered load is measured and stored in centum-call seconds (CCS) (i.e., 100 seconds of a telephone connection) to assure an accurate quantification of the load on the affected switches. Alternatively, the offered load may be measured in call volume, although the results may be skewed due to an excessive number of unusually short (or long) telephone calls.

At step s216, the peak busy hour offered load for the subject point-to-point community of interest is compared to a high usage threshold number X, predetermined by network engineering as the minimum offered load justifying a dedicated direct trunk between the switches. The determination of X is subjective, and depends on consideration of many factors in addition to call volume, such as economic, contractual and network limitations. For example, economic limitations include the relative cost of adding an incremental circuit, such as the cost of additional switches or trunk groups, and corresponding budget constraints. Contractual limitations include consideration of agreements to dedicate predetermined amounts of switch capability to alternate carriers, such as CLECs and IXCs. The network limitations are defined by the existing network infrastructure, and include considerations of the existing resources and potential access to these resources for call routing. Based on typical considerations, an example of X may be 24 voice grade, 64 kbps circuits, which translates to approximately 540 ccs.

When the offered load is less than the threshold X, data indicating this fact is stored in the historical application database 46 for future reference by network engineering at step s226. The process may then repeat itself with respect to other point-to-point communities of interest, as described above.

When the offered load exceeds the threshold X, the application server 42 determines whether a direct trunk group already exists between the locations A and Z at step s218. In an embodiment of the invention, the determination is made using an interface to a Legacy operation support system, such as a trunk integrated records keeping system (TIRKS) or a total network data system (TNDS). For example, the direct trunk group 72 already exists between the SSP 14 and the SSP 16 of FIG. 1. When a direct trunk group exists, the application server 42 identifies the community of interest as an augmentation opportunity for other existing high usage direct trunk groups at step s220. The augmentation opportunity is stored in the application database 46 at step s226 for future reference.

When it is determined at step s218 that there is no direct trunk group existing between the locations A and Z, the application server 42 identifies the point-to-point community of interest as a new primary high usage direct trunk group opportunity at step s222. In other words, based on the empirical signaling data collected from the tandem switches in the PSTN by the application server 42, the call volume between the locations A and Z is determined to be sufficient to warrant a direct trunk group connection between the two locations. At step s224, the application server 42 sizes the new direct trunk group opportunity by estimating the initial traffic load on the direct trunk group, based on the SS7 signaling data, if it were implemented between the subject end offices. Sizing the new primary high usage direct trunk group opportunity includes application of traffic engineering algorithms, such as the well-known Erlang-B traffic engineering algorithm. Application of the traffic flow algorithm associates the number of serving trunks with offer load capacity and associated grade of service (GOS) and percentage of call blocking. The application server 42 may also perform the conversion of estimated traffic load to a specific number of trunks (or trunk groups) sufficient to accommodate the estimated load.

At step S226, information regarding new primary high usage direct trunk group opportunities is stored in the application database 46, including the identity of new primary high usage direct trunk group opportunities. The application database 46 may further include corresponding estimated initial traffic load and number of trunks to handle the estimated traffic load. The stored information is subsequently included in engineering considerations, using the peak busy hour offered loads and a recommended GOS (e.g., 1 percent chance of reaching a busy signal) and objective probability of blocking (e.g., 99 percent successful call completion). Use of the information again depends on numerous considerations, including economic, contractual and network limitations. For example, an engineer may determine to implement more trunks than specifically calculated by the application server 42, based on anticipated increases in traffic or a desired higher than normal quality of service in the particular community of interest. The engineering effort is enabled in an embodiment of the invention by accessing the application server 42 and the application database 46 from client 52 via the intranet 50, as discussed above.

When a new primary high usage trunk group opportunity is implemented, a direct trunk group is added to connect the locations A and Z of the point-to-point community of interest. By implementing a direct connection, the need for at least one trunk group to an intervening tandem switch (i.e., one hop) is eliminated. By building out a primary high usage trunk group opportunity, the current traffic and future traffic growth is relieved from the bypassed tandem switch, providing immediate and long term relief. As a result, a tandem switch experiences a decrease in required digital signal ports (e.g., DS-0 ports) and facilities from both the inbound and outbound legs. The reduction in load is approximately two ports for every new (or augmented) direct trunk group added to transit or bypass a single tandem switch, and four ports for every new (or augmented) direct trunk group added to transit two tandem switches.

Figure 3:
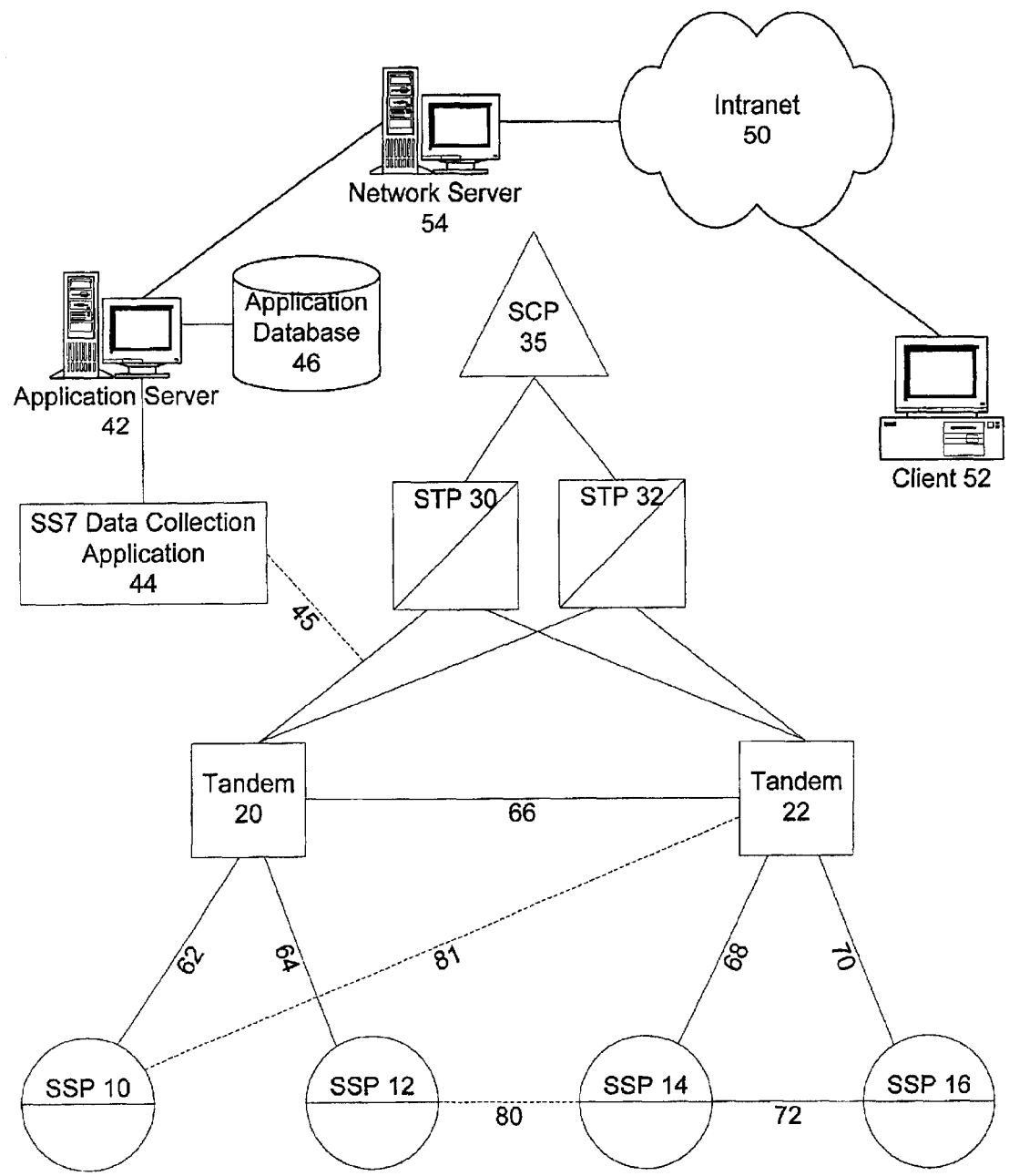
FIG. 3 is a block diagram showing an exemplary telecommunications network for trunk design optimization indicating new direct trunk group routing, according to an aspect of the present invention.

FIG. 3 is a block diagram depicting the exemplary telecommunications network of FIG. 1 after high usage direct trunk group opportunities have been identified. The dashed line 80 shows a new primary high usage direct trunk group opportunity between the SSP 12 and the SSP 14, which was identified according to the procedure of FIG. 2. Implementation of the new primary high usage direct trunk group 80 relieves traffic directed through the tandem switch 20 and the tandem switch 22. In other words, the routing of calls originating at the SSP 12 and terminating at the SSP 14, would be reduced from three hops to one hop through the PSTN.

As stated above, the application logic of FIG. 2 may also be applied to identify new intermediate high usage direct trunk groups, although the value of the threshold offered load X applied at step s216 may differ for determining the intermediate high usage direct trunk group opportunities, depending on design considerations. At least one of the A and Z locations of the point-to-point communities of interest must be an intermediate or class four switch. For example, referring to FIG. 1, a point-to-point community of interest exists between the SSP 10 and the tandem switch 22. When the traffic between these locations exceeds X, the community of interest between the SSP 10 and the tandem switch 22 will be identified as a new intermediate high usage direct trunk group opportunity, indicated by the dashed line 81 in FIG. 3. Implementation of the new intermediate high usage direct trunk group opportunity relieves traffic directed through the tandem switch 20.

Implementing intermediate high usage direct trunk group opportunities may result in an end office being "rehomed" to another tandem switch. For example, referring to FIG. 3, the existing "home tandem" for the SSP 10 is the tandem switch 20 and an existing "far tandem" for the SSP 10 is the tandem switch 22. When the direct trunk group 81 is implemented, the SSP 10 is "rehomed" from the tandem switch 20 to the new home tandem, tandem switch 22. Implementation of the direct trunk group 81 necessarily impacts the traffic among the tandem switches in the PSTN, which must be analyzed.

Figure 4:
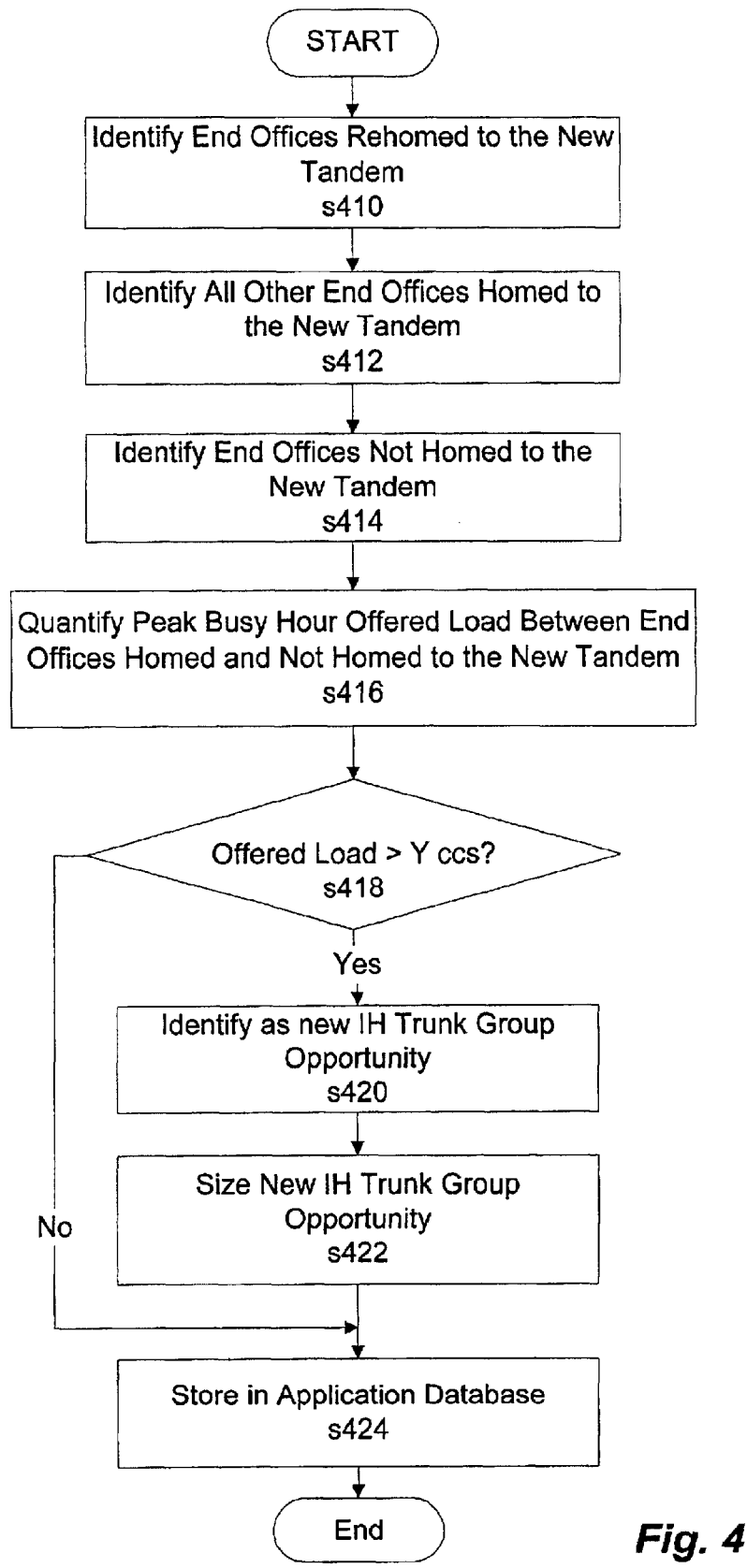
FIG. 4 is a flowchart of exemplary application logic for identifying new intermediate high usage direct trunk groups, according to an aspect of the present invention.

FIG. 4 is a flowchart depicting the process for accurately estimating the sizing of the intermediate high usage direct trunk groups to a new tandem switch using empirical demand data supplied through the SS7 data collection application 44. Accordingly, the end offices that have been rehomed to a new tandem switch are identified at step s410. In the above example, the SSP 10 is identified as a rehomed end office. At step s412, all other end offices homed (and rehomed) to the new tandem switch are also identified. For example, the SSP 14 and the SSP 16 would be identified as end offices homed to the new tandem switch, tandem switch 22. Likewise, all of the end offices that remain homed to the tandem switch to which the rehomed end office was originally homed, as well as end offices homed to any tandem switches in the relevant portion of the telecommunications system other than the new tandem switch, are identified at step s414 and may be designated as far end offices. In the example, the only other end office depicted in FIG. 3 not homed to the tandem switch 22 is the SSP 12, which remains homed to the tandem switch 20.

At step s416 the peak busy hour offered load is quantified for traffic between each end office not homed to the new tandem switch (i.e., each far end office) and each end office homed to the new tandem switch. For example, the peak busy hour offered load would be quantified for traffic between the SSP 12 and the SSP 10, the SSP 14 and the SSP 16, respectively. The peak busy hour offered load is compared to a predetermined threshold Y at step s418 for each pair of end offices. (The threshold Y may correspond to the intermediate high usage direct trunk group opportunity threshold, discussed above.) Like the threshold X, described above, the threshold Y is set based on numerous engineering considerations, including economic, contractual and network limitations. Based on such considerations, the threshold Y may also be set, for example, to 24 circuits.

When the peak busy hour offered load does not exceed Y for a pair of end offices, the information is simply recorded in the application database 46 at step s424 for future design and engineering consideration. However, a pair of end offices having a peak busy hour offered load greater than Y is identified as a new intermediate high usage trunk group opportunity at step s420. The new intermediate high usage direct trunk group opportunity is sized at step s422 to determine, for example, the estimated initial traffic load and the corresponding number of trunks needed to handle the traffic load. Sizing the new intermediate high usage direct trunk group opportunity includes application of traffic engineering algorithms, such as the well-known Neal-Wilkinson traffic engineering algorithm. The new direct trunk group opportunity and the associated sizing information is stored in the application database 46 at step s424. To facilitate explanation, FIG. 4 depicts comparing and processing an offered load of only one pair of tandems, homed and not homed to the new tandem. However, multiple offered loads for multiple pairs of tandems may be accommodated by repeating steps s416 to s424.

Figure 5:
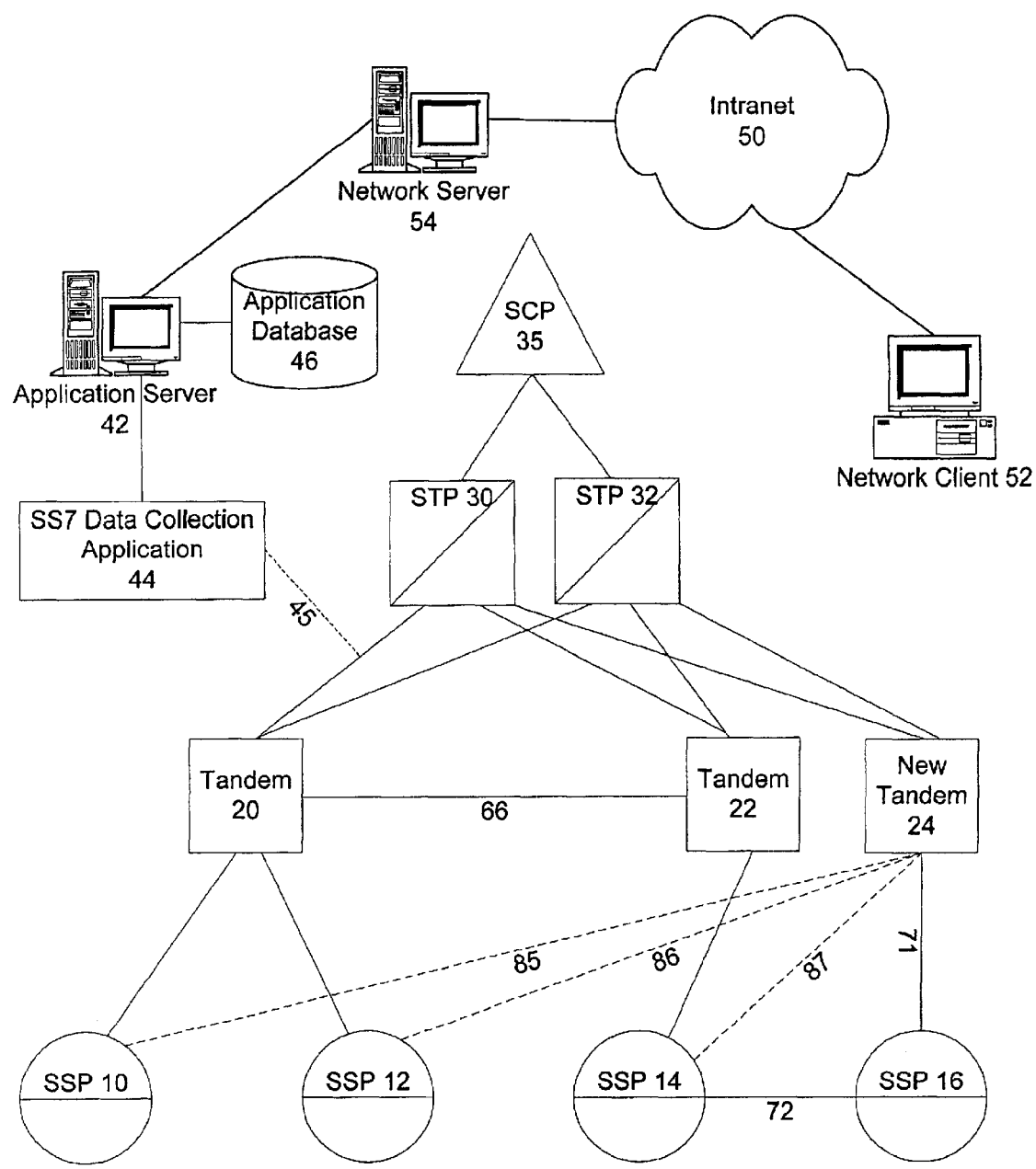
FIG. 5 is a block diagram showing an exemplary telecommunications network for trunk design optimization indicating potential trunk group routing to a new tandem switch, according to an aspect of the present invention.

In a related example, design engineering determines that a new tandem switch 24 is warranted to service the SSP 16, based on analysis of empirical traffic flow data, as discussed above. FIG. 5 shows an exemplary telecommunications network including the additional tandem switch, new tandem switch 24, which is implemented with a direct trunk group 71 connection to the SSP 16. In other words, the SSP 16 has been rehomed from the tandem switch 22 to the new tandem switch 24. Therefore, the SSP 16 is identified as having been rehomed to the new tandem switch 24 at step s410 of FIG. 4. At step s412, it is determined that no other end offices have been rehomed to the new tandem switch 24. At step s414, the SSP 10, the SSP 12 and the SSP 14 are identified as the end offices not homed to the new tandem switch 24. The peak busy hour offered load is therefore quantified between the SSP 16 and each of the other end offices at step s416.

When an offered load exceeds Y, as determined at step s418, the relationship is identified as a new intermediate high usage trunk group opportunity at step s420. The potential intermediate high usage trunk group opportunities are depicted in FIG. 5 by dashed lines 85, 86 and 87 connecting the SSP 10, the SSP 12 and the SSP 14 to the new tandem switch 24, respectively. The new intermediate high usage trunk group opportunities are sized accordingly at step s422 and stored in the application database at step s424. When an offered load does not exceed Y, the respective end office routes calls to the rehomed end office SSP 16 in accordance with the existing trunk groups. For example, when the peak busy hour offered load between the SSP 10 and the SSP 16 is determined to be less than Y at step s418, network engineering would likely determine to route calls originating at the SSP 10 through the tandem switch 20, through the tandem switch 22, through the new tandem switch 24, to the rehomed SSP 16.

In addition to relieving overburdened tandem switches, design engineering may increase network efficiency and further reduce associated costs by identifying and correcting traffic misrouted in the existing network. Traffic misroutes occur when an available and preferred route is not selected by an originating end office during call setup. A routing error of this type is usually caused by an error in telephone exchange code translation, such as the numbering plan area (NPA)/local exchange (NXX) code. Correcting traffic misroutes eliminates at least one hop between the originating end office and the terminating end office, increasing network efficiency, taking advantage of existing direct trunk groups between end offices and reducing the traffic load on the tandem switch to which calls were being misrouted.

Figure 6:
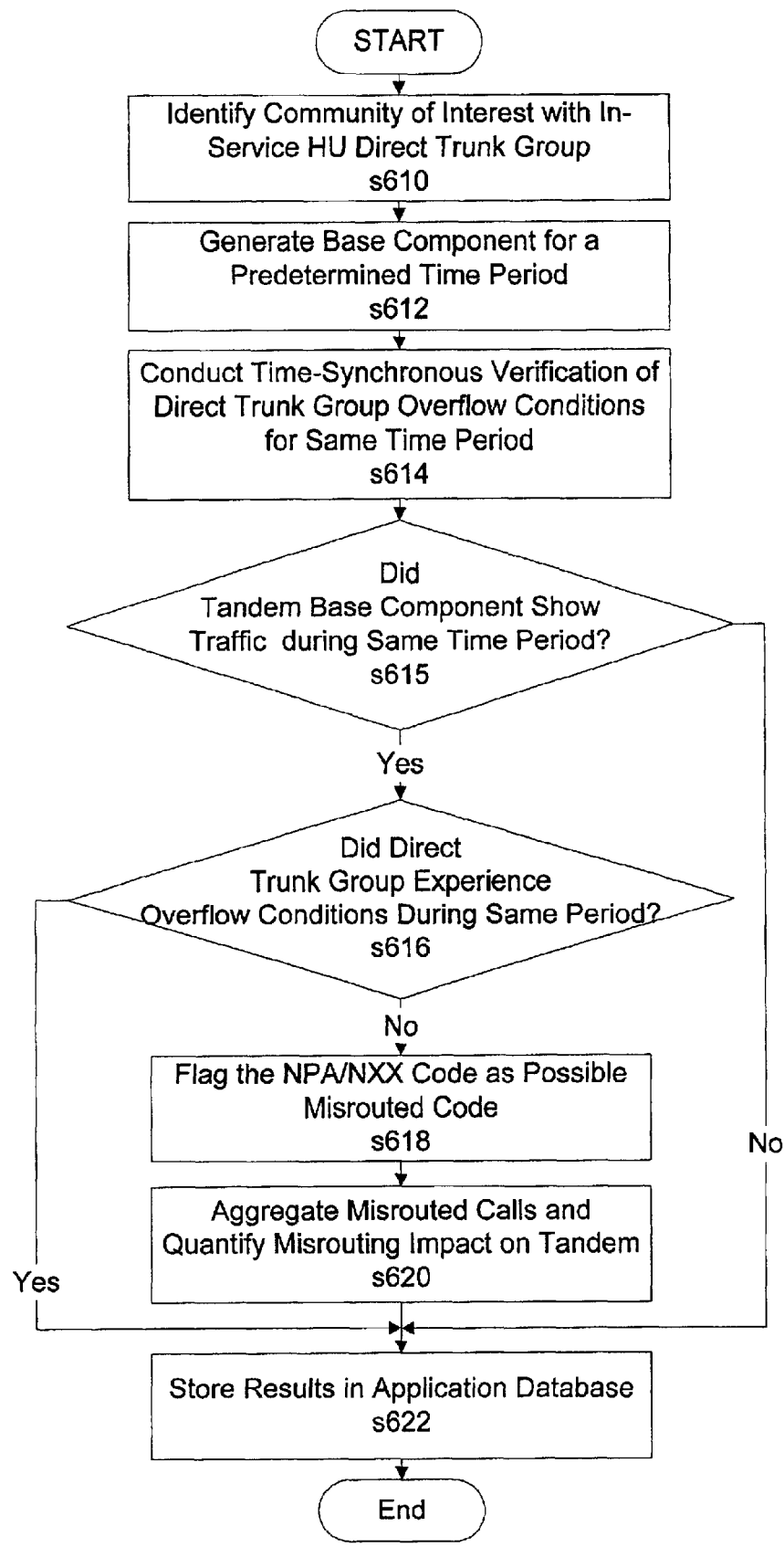
FIG. 6 a flowchart of exemplary application logic for identifying traffic misroutes, according to an aspect of the present invention

FIG. 6 is a flowchart of exemplary application logic performed by the application server 42 to identify traffic misroutes. Again, the application server 42 receives the empirical data for analysis from the PSTN via the SS7 data collection application 44. At step s610, a point-to-point community of interest is identified having in-service primary high usage direct trunk group between two end offices. For example, referring to FIG. 1, the community of interest incorporating the SSP 14 and the SSP 16 includes the primary high usage direct trunk group 72. At step s612, a base component is generated for a predetermined time period for the point-to-point community of interest. Although FIG. 6 depicts generating the base component for only one time period of one point-to-point community of interest, the invention encompasses generating (and processing) multiple time periods for corresponding multiple point-to-point communities of interest. For example, the base component may be generated for each hour in a 24 hour period for a point-to-point community of interest.

At step s614, conduct time-synchronous verification of the direct trunk group overflow conditions for the same point-to-point community of interest over the same predetermined time period. For example, in an embodiment of the invention, the time-synchronous verification may also be conducted for each hour of a 24 hour period. The data for generating the base component and conducting the time-synchronous verification is also collected via the SS7 data collection application. Because the SSP 14 and the SSP 16 do not directly provide SS7 signaling data to the SS7 data collection application 44 in the depicted embodiment, the existence of an overflow condition is determined by examining data from a Legacy operation support system, generally used for maintenance applications, such as TNDS or a data collection operations system (DCOS). The time-synchronous verification data may be collected contemporaneously with the base component data, or otherwise.

The application server 42 determines at step s615 whether a tandem base component included in the point-to-point community of interest shows traffic during each hour over the 24 hour period. For example, it is determined at step s615 whether the SS7 signaling data from the tandem switch 22 indicates traffic between the SSP 14 and the SSP 16 for each hour in a 24 hour period. When there is no traffic in the tandem switch 22, this information is simply stored in the application database 46 at step s622 for historical reference and the next tandem base component is analyzed, i.e., the process returns to step s614. When the base component of the tandem switch 22 indicates traffic flow between the SSP 14 and the SSP 16, the application server 42 compares at step s616 any overflow conditions experienced by the direct trunk group 72, as determined at step s614. When an overflow condition existed during the same predetermined time period, then the traffic through the tandem switch 22 is apparently warranted and the information is simply stored in the application database 46 at step s622.

However, when no overflow condition existed in the direct trunk group 72 during the same predetermined time period, the traffic passing through the tandem switch 22 has been misrouted. In other words, a more direct and preferable route was available (i.e., the direct trunk group 72), yet the originating end office, the SSP 14, routed the traffic through the tandem switch 22 to the SSP 16. At step s618, the application server 42 flags the NPA/NXX code of the misrouted calls as a misrouted code. Also, the misrouted traffic is aggregated in order to accurately quantify the impact on the tandem switch 22 at step s620. The data regarding the misrouted traffic is stored in the application database 46 at step s622 for use in subsequent network design engineering considerations.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

What is claimed is:

1. A method for optimizing network trunk design by identifying misrouting of traffic in a telecommunications network, the method comprising:
    identifying a community of interest based on call signaling data, the community of interest comprising at least one intermediate switching location connected to a first terminal switching location connected by a direct trunk to a second terminal switching location;
    determining whether traffic in the community of interest passes through the at least one intermediate switching location during a predetermined time period; and
    determining whether the direct trunk experienced an overflow condition during the predetermined time period;
    when traffic in the community of interest is determined to have passed through the at least one intermediate switching location during the predetermined time period, and the direct trunk is determined not to have experienced an overflow condition during the predetermined time period, designating an identifier associated with the traffic that passed through the at least one intermediate switching location as misrouted traffic.

2. The method according to claim 1, further comprising:
    flagging the identifier associated with the misrouted traffic to redirect the misrouted traffic through the direct trunk.

3. A method for optimizing network trunk design by identifying misrouting of traffic in a telecommunications network, the method comprising:
    identifying a community of interest based on call signaling data, the community of interest comprising at least one intermediate switching location connected to a first terminal switching location connected by a direct trunk to a second terminal switching location;
    determining whether traffic in the community of interest passes through the at least one intermediate switching location during a predetermined time period;
    determining whether the direct trunk experienced an overflow condition during the predetermined time period;
    when traffic in the community of interest is determined to have passed through the at least one intermediate switching location during the predetermined time period, and the direct trunk is determined not to have experienced an overflow condition during the predetermined time period, designating an identifier associated with the traffic that passed through the at least one intermediate switching location as misrouted traffic;
    identifying a volume of the misrouted traffic; and
    quantifying a load on the at least one intermediate switch attributed to the misrouted traffic based on the volume.

4. The method according to claim 1, in which the signaling data comprises out-of-band signaling data collected from the at least one intermediate switching location in the telecommunications network.

5. The method according to claim 4, in which the out-of-band signaling data comprises signaling system 7 (SS7) messages.

6. The method according to claim 1, in which the at least one intermediate switching location comprises a class four switch.

7. The method according to claim 1, in which the first and second terminal switching locations comprise class five switches.

8. The method according to claim 1, in which the identifier associated with the misrouted traffic comprises an exchange code.

9. The method according to claim 8, in which the exchange code comprises a numbering plan area (NPA)/local exchange (NXX) code.

10. A method for enhancing design of a telecommunications network by identifying misrouting of traffic in a community of interest of the telecommunications network, the community of interest comprising at least a tandem switch connected to a first end office switch connected by a direct trunk to a second end office switch, the method comprising:
    generating a base component relating to the community of interest based on out-of-band signaling data, the base component comprising a plurality of predetermined time periods and a volume of traffic passing through the tandem switch in the community of interest during each of the plurality of predetermined time periods; and
    determining whether the base component indicates traffic through the tandem switch in the community of interest during at least one of the plurality of predetermined time periods;
    when the tandem switch shows traffic, determining whether the direct trunk experienced an overflow condition during the corresponding at least one of the plurality of predetermined time periods; and
    when the direct trunk did not experience the overflow condition during the corresponding at least one of the plurality of predetermined time periods, identifying at least one unique code associated with the community of interest as a misrouted code.

11. The method according to claim 10, in which the out-of-band signaling data comprises signaling system 7 (SS7) messages.

12. A method for enhancing design of a telecommunications network by identifying misrouting of traffic in a community of interest of the telecommunications network, the community of interest comprising at least a tandem switch connected to a first end office switch connected by a direct trunk to a second end office switch, the method comprising:
    generating a base component relating to the community of interest based on out-of-band signaling data, the base component comprising a plurality of predetermined time periods and a volume of traffic passing through the tandem switch in the community of interest during each of the plurality of predetermined time periods;
    determining whether the base component indicates traffic through the tandem switch in the community of interest during at least one of the plurality of predetermined time periods;
    when the tandem switch shows traffic, determining whether the direct trunk experienced an overflow condition during the corresponding at least one of the plurality of predetermined time periods;
    when the direct trunk did not experience the overflow condition during the corresponding at least one of the plurality of predetermined time periods, identifying at least one unique code associated with the community of interest as a misrouted code;
    identifying a volume of the traffic associated with the misrouted code; and quantifying a load on the tandem switch attributed to the misrouted traffic.

13. The method according to claim 10, in which the at least one unique code comprises a numbering plan area (NPA)/local exchange (NXX) code.

14. A system for optimizing trunk design by identifying misrouting of traffic in a telecommunications network, the system comprising:
   a data collection application device, configured to receive out-of-band signaling data from a public switched telephone network; and
   an application server connected to the data collection application device, the application server identifying a community of interest in the public switched telephone network based on the out-of-band signaling data received by the data collection application device, the community of interest comprising at least one intermediate switching location connected to a first terminal switching location and a second terminal switching location, the first terminal switching location being connected by a direct trunk to the second terminal switching location; the application server determining whether traffic in the community of interest passes through the at least one intermediate switching location during a predetermined time period and whether the direct trunk experienced an overflow condition during the predetermined time period; and
   when traffic in the community of interest is determined to have passed through the at least one intermediate switching location and the direct trunk is determined not to have experienced an overflow condition during the predetermined time period, the application server designating an identifier associated with the traffic that passed through the at least one intermediate switching location as misrouted traffic.

15. The system according to claim 14, further comprising:
   an application database, connected to the application server, that stores information relating to at least the community of interest, the determination of whether the traffic passed through the at least one intermediate switching location during the predetermined time period, the determination of whether the direct trunk group experienced an overflow condition during the predetermined time period, and the identifier.

16. The system according to claim 15, further comprising:
   a data network connecting the application server and the application database to at least one graphical user interface and enabling analysis of the stored information.

17. The system according to claim 14, in which the identifier comprises a numbering plan area (NPA)/local exchange (NXX) code.

18. The system according to claim 14, in which the out-of-band signaling data comprises signaling system 7 (SS7).

19. A system for enhancing efficiency of a public switched telephone network (PSTN) design by identifying misrouting of traffic in a community of interest of the PSTN, the community of interest comprising at least one tandem switch connected to a first end office switch connected by a direct trunk to a second end office switch, the system comprising:
   a signaling system 7 (SS7) data collection device, configured to receive out-of-band signaling data from the PSTN; and
   an application server connected to the data collection device, the application server identifying the community of interest and determining whether traffic in the community of interest passes through the at least one tandem switch in the community of interest during a predetermined time period, based on the out-of-band signaling data provided by the data collection device; when traffic in the community of interest is determined to have passed through the at least one tandem switch, the application server further determining whether the direct trunk experienced an overflow condition during the predetermined time period; and when the direct trunk did not experience an overflow condition during the predetermined time period, the application server designating at least one exchange code associated with the traffic that passed through the at least one tandem switch as a misrouted code;
   wherein the application server, together with an associated database, is configured to provide information relating to at least the community of interest, the tandem switch and the misrouted code to at least one graphical user interface.

20. A system for enhancing efficiency of a public switched telephone network (PSTN) design by identifying misrouting of traffic in a community of interest of the PSTN, the community of interest comprising at least one tandem switch connected to a first end office switch connected by a direct trunk to a second end office switch, the system comprising;
   a signaling system 7 (SS7) data collection device, configured to receive out-of-band signaling data from the PSTN; and
   an application server connected to the data collection device, the application server identifying the community of interest and determining whether traffic in the community of interest passes through the at least one tandem switch in the community of interest during a predetermined time period, based on the out-of-band signaling data provided by the data collection device; when traffic in the community of interest is determined to have passed through the at least one tandem switch, the application server further determining whether the direct trunk experienced an overflow condition during the predetermined time period; and when the direct trunk did not experience an overflow condition during the predetermined time period, the application server designating at least one exchange code associated with the traffic that passed through the at least one tandem switch as a misrouted code;
   wherein the application server, together with an associated database, is configured to provide information relating to at least the community of interest, the tandem switch and the misrouted code to at least one graphical user interface; and
   wherein the application server identifies a volume of the traffic having the misrouted code and quantifies a load on the at least one tandem switch attributed to the misrouted traffic based on the volume.

21. A computer readable medium for storing a computer program that identifies misrouting of traffic in a community of interest of a telecommunications network for use in optimizing design of the network, the community of interest comprising at least a tandem switch connected to a first end office switch and a second end office switch, the computer readable medium comprising:
   a generating source code segment that generates a base component relating to the community of interest based on out-of-band signaling data, the base component comprising a plurality of predetermined time periods and a volume of traffic passing through the tandem switch in the community of interest during each of the plurality of predetermined time periods;

a determining source code segment that determines whether the base component indicates traffic through the tandem switch in the community of interest during at least one of the plurality of predetermined time periods and, when the tandem switch shows traffic, determines whether the direct trunk experienced an overflow condition during the corresponding at least one of the plurality of predetermined time periods; and an identifying source code segment that identifies at least one unique code associated with the community of interest as a misrouted code when the direct trunk did not experience the overflow condition during the corresponding at least one of the plurality of predetermined time periods.

22. The computer readable medium according to claim 21, in which the out-of-band signaling data comprises signaling system 7 (SS7) messages.

* * * * *